United States Patent [19]
Luiz

[11] Patent Number: 5,615,640
[45] Date of Patent: Apr. 1, 1997

[54] PET EMERGENCY DISASTER SHELTER AND METHOD

[76] Inventor: Kim M. Luiz, 1849 Mendocino St., Seaside, Calif. 93955

[21] Appl. No.: 514,584

[22] Filed: Aug. 14, 1995

[51] Int. Cl.$^6$ .................................................. A01K 1/02
[52] U.S. Cl. ........................................................ 119/482
[58] Field of Search ............................ 119/416, 453, 119/454, 475, 479, 496, 498, 512, 513, 515, 28.5

[56] References Cited

U.S. PATENT DOCUMENTS

| | | | |
|---|---|---|---|
| 3,814,058 | 6/1974 | Thompson | 119/28.5 X |
| 3,934,552 | 1/1976 | Kulka | 119/2.85 X |
| 4,729,343 | 3/1988 | Evans | 119/28.5 X |
| 5,282,439 | 2/1994 | Oaks | 119/28.5 X |

*Primary Examiner*—Thomas Price
*Attorney, Agent, or Firm*—John S. Christopher

[57] ABSTRACT

A pet emergency disaster shelter typically utilized during a natural disaster to provide temporary emergency survival housing to a domestic pet to increase the probability that the pet will survive the disaster is disclosed. The pet emergency disaster shelter comprises a lower base section formed of a moisture-resistant, buoyant shell. The lower base section has a top surface supported by an air mattress positioned within the buoyant shell. The top surface and the air mattress in combination support the weight of the pet. An upper dome section is mounted upon the lower base section for housing the pet. The upper dome section includes a weather-resistant material for providing protection to the pet against a plurality of weather conditions. In a preferred embodiment, the upper dome section is mounted upon and attached to the lower base section in a suitable manner as by adhesives. The top surface of the lower base section is sloped and serves as a floor to the pet within the upper dome section. The weight of the pet is supported by the sloped top surface and by an air mattress mounted within the buoyant shell of the lower base section. A penetration formed at the center of the sloped top surface of the lower base section serves as an entry point to a waste material depository. The upper dome section, which includes facilities for dispensing food and water to the pet, is held in position by a pressurized air channel system. The shelter is balanced by a plurality of ballast compartments.

20 Claims, 3 Drawing Sheets

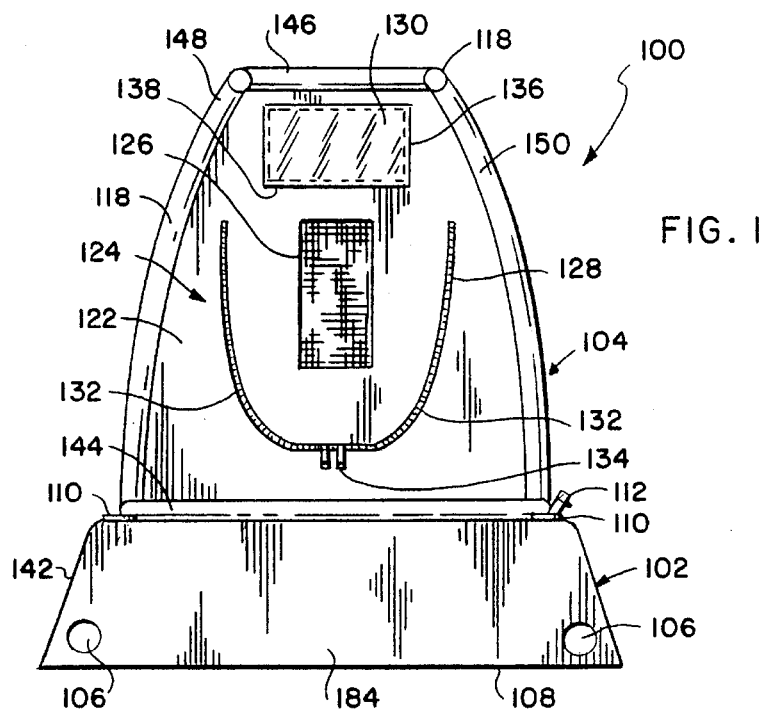

5,615,640

PET EMERGENCY DISASTER SHELTER AND METHOD

BACKGROUND OF THE INVENTION

1. Field of the Invention

The present invention relates to emergency survival shelters for domestic pets. More specifically, the present invention relates to methods and apparatus for a pet emergency disaster shelter that provides temporary emergency survival housing for domestic pets during natural disasters such as floods and other emergencies.

2. Description of the Related Art

Natural disasters such as floods, earthquakes, hurricanes, cyclones and the like have occurred frequently in the last decade. When natural disasters occur, it is often unsafe to be out-of-doors and thus humans and their domestic pets seek the safety of an indoor shelter. A conventional outdoor pet shelter, such as a dog house, does not provide adequate protection to the pet during a natural disaster. It is believed that animals can often detect the preliminary stages of a natural disaster, such as an earthquake, before the disaster is detected by their human counterparts. When this occurs, animals often become frightened and seek a hiding place.

Sometimes indoor shelters, such as a residential building, must be evacuated when a natural disasters occurs. For example, tumultuous floods, earthquakes and brush fires have recently occurred in the State of California. During these natural disasters, many residential buildings were abandoned by humans attempting to avoid injury. During the process of abandoning a building during a natural disaster, humans often must abandon their domestic pets particularly if the pets cannot be found or if the means of escape cannot conveniently accommodate the pets.

For example, during the floods that occurred in January, 1995 in Northern California, some human residents were rescued by boat, helicopter or other unconventional means. Under these conditions, many pets were not rescued and were required to survive the natural disaster without human assistance. Since conventional outdoor pet shelters positioned directly on the ground do not provide protection from flood waters, pets were often required to seek high ground, such as a roof top, to avoid drowning. Many of these pets were often exposed to the elements and were without food and water for many days until the flood waters receded. Consequently, the probability that many pets will not survive this type of natural disaster is high. Only if the pet is successful in finding shelter and food during the natural disaster does the probability of survival improve.

Thus, there is a need in the art for an improvement in conventional pet shelters which increases the probability that a pet will survive a natural disaster on a temporary basis which incorporates a water protective enclosure which is fitted with feeding, ventilating and waste storing facilities and is mounted upon a floatation member that can be tethered to a fixed object.

SUMMARY OF THE INVENTION

The need in the art is addressed by the pet emergency disaster shelter and method of the present invention. The invention is typically utilized during a natural disaster to provide temporary emergency survival housing to a domestic pet to increase the probability that the pet will survive the disaster. The pet emergency disaster shelter comprises a lower base section formed of a moisture-resistant, buoyant shell. The lower base section has a top surface supported by an air mattress positioned within the buoyant shell. The top surface and the air mattress in combination support the weight of the pet. An upper dome section is mounted upon the lower base section for housing the pet. The upper dome section includes a weather-resistant material for providing protection to the pet against a plurality of weather conditions.

In a preferred embodiment, the upper dome section is mounted upon and attached to the lower base section in a suitable manner as by adhesives. The top surface of the lower base section is sloped and serves as a floor to the pet within the upper dome section. The weight of the pet is supported by the sloped top surface and by an air mattress mounted within the buoyant shell of the lower base section. A penetration formed at the center of the sloped top surface of the lower base section serves as an entry point to a waste material depository. The upper dome section, which includes facilities for dispensing food and water to the pet, is held in position by a pressurized air channel system. The shelter is balanced by a plurality of ballast compartments.

BRIEF DESCRIPTION OF THE DRAWINGS

FIG. 1 is a front elevational view of the pet emergency disaster shelter of the present invention showing an enclosed upper dome section mounted upon a buoyant shell base section designed to support the upper dome section.

FIG. 2 is a top planar view of the pet emergency disaster shelter of FIG. 1 showing a pressurized air channel system incorporated within the upper dome section mounted upon the buoyant shell base section.

DESCRIPTION OF THE INVENTION

Figure 3:
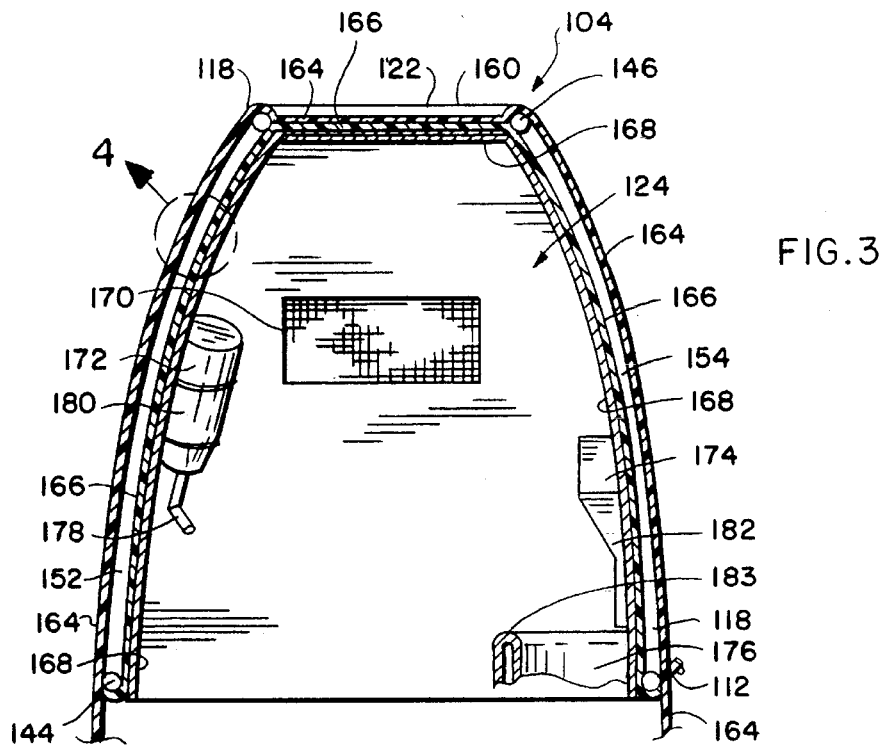
FIG. 3 is a partial cross-sectional view of the pet emergency disaster shelter taken along the line 3—3 of FIG. 2 showing the rear interior space of the shelter including a temporary water source and food source combined with a fragmentary view of a feeding bowl formed on the top surface of the buoyant shell base section.

The present invention is a pet emergency disaster shelter 100 and method as shown in FIG. 1. The shelter 100 is typically employed during a natural disaster such as a flood to provide temporary emergency survival housing to a domestic pet. The shelter, which is buoyant, increases the probability that the pet will survive the disaster.

The pet emergency disaster shelter 100 shown in FIG. 1 includes a lower base section 102 and an upper dome section 104 mounted upon the base section 102. The base section 102 may be constructed of a lightweight, unbreakable plastic material such as polyvinyl chloride (PVC). The base section 102 includes a plurality of tie-down penetrations 106 utilized to connect a tie line (not shown) thereto for tethering the shelter 100 to a fixed object (not shown). This feature is useful in the case of a flood. A bottom surface 108 of the base section 102 is comprised of rubber and can be, for example, a recycled two-ply tire shown best in FIG. 5. The recycled rubber bottom surface 108 can be applied to the bottom edge of the base section 102 by a suitable adhesive.

The top of the base section 102 shown in FIG. 1 (but shown better in FIGS. 2, 5 and 7) also illustrates two (of a set of four) plastic hinged caps 110 and an air inflation valve 112. The plastic hinged caps 110 are removable and are employed to seal via snap fit a plurality of openings 114 (shown in FIG. 6) lo a corresponding number of ballast compartments 116 (shown in FIG. 5) and discussed hereinbelow. The plastic caps 110 are attached to, e.g., hinged to, the plastic base section 102 as is known in the art. The air inflation valve 112 is utilized to pneumatically pressurize an air channel system 118 shown in FIGS. 1–3. The air channel system 118 is employed to support the upper dome section 104 and is discussed in more detail in the description relating to FIG. 2. A sealed air mattress 120 is located within the base section 102 and is discussed in detail in the description relating to FIG. 5.

The upper dome section 104 shown in FIG. 1 includes the pressurized air channel system 118 which is fabricated from and supports a multi-layer, weather-resistant material 122. The multi-layer, weather-resistant material 122 can include any number of known plastic or film-coated materials which repel inclement weather and exhibit a robust construction. A suitable example is polyvinyl chloride which can be of a heavy duty gauge, if desired. In particular, the weather-resistant material 122 is employed to form an enclosure 124 shown best in FIGS. 1 and 3. The multi-layer, weather-resistant material 122 can be fashioned to form the air channel system 118 and to serve as the enclosure 124 by known heat sealing methods. Heat sealing the weather-resistant material 122 to form the air channel system 118 and the enclosure 124 increases the resistance of the material 122 to displacement by wind or rain. Because the shelter 100 is utilized during emergency conditions, the weather-resistant material 122 can exhibit a color that attracts attention such as, for example, hunters orange.

Additional features illustrated in FIG. 1 include a front nylon screen mesh window 126 for promoting air flow, an access door 128 for facilitating entry and egress and a pet information card 130. The front screen mesh window 126 can be comprised of a plastic or synthetic material compatible with and integrated into the weather-resistant material 122 by heat sealing methods known in the art. The screen mesh window 126 provides the pet with a source of fresh air and a view of the outdoors. The access door 128 provides a means of entry and exit to the pet and is formed by integrating a pair of mechanical zippers 132 into the weather-resistant material 122 at the front of the shelter 100 as shown in FIG. 1. The pair of zippers 132 should be of the nylon type as is known in the art, however, they can also be of the metallic type. When the zippers 132 are operated by a zipper handle 134 so that the access door 128 is open, the door 128 is comprised of a flap of the weather-resistant material 122. The access door 128, with the screen mesh window 126 mounted therein, can be manually raised to provide entry and exit to the enclosure 124 of the upper dome section 104. The access door 128 can be closed by lowering the flap of weather-resistant material 122 and operating the zippers 132 by the zipper handles 134 to seal the door 128 closed.

The information card 130 is mounted above the access door 128 and the screen mesh window 126 as shown in FIG. 1. The information card 130 is positioned within a plastic enclosure 136 having a nylon enclosure zipper (not shown) formed along the bottom edge of the plastic enclosure 136. A velcro flap 138 is formed over and hides the enclosure zipper (not shown) along the bottom of the plastic enclosure 136. The information card 130 can include data relevant to the pet occupying the shelter 100 such as name, address, owner identification, registration tag number, inoculation record, date pet placed in the shelter 100 and the like. This data information will make it possible to return the pet to its home once the emergency conditions have subsided.

A top planar view of the shelter 100 is clearly disclosed in FIG. 2 showing the upper dome section 104. Only that portion of the lower base section 102 which is not hidden from view by the dome section 104 is visible. The base section 102 as shown in FIG. 2 includes a top surface 140 upon which the dome section 104 is mounted. Located in each corner of the top surface 140 is one of the set of four plastic hinged caps 110 utilized to seal each of the ballast compartments 116 shown in FIG. 5. Sloping downward from the top surface 140 to the bottom surface 108 of the lower base section 102 is a plurality of sides 142. The top surface 140 and each of the sides 142 of the base section 102 is comprised of, for example, plastic and can be formed in an injection molding process as is known in the art. The sides 142 in combination with the top surface 140 provide the structural support for the upper dome section 104 and the pet residing therein. Also shown is the plurality of tie-down penetrations 106 located at each of the four corners of the base section 102 of the shelter 100.

The upper dome section 104 is shown mounted upon the lower base section 102 in FIG. 2. The pressurized air channel system 118 is clearly visible in the planar view of FIG. 2 and serves to support the entire upper dome section 104 without the requirement of any additional structural member. The air channel system 118 is comprised of a plurality or system of inflation tubes including a base perimeter tube 144, a top ring tube 146, a pair of front vertical tubes 148 and 150, a pair of lateral vertical tubes 152 and 154, and a pair of rear vertical tubes 156 and 158. It is noted that the plurality of inflation tubes that form the pressurized air channel system 118 is independent of the sealed air mattress 120 located within the lower base section 102. Each of the plurality of inflation tubes of the air channel system 118 is a 1" diameter tube and is pressurized via the air inflation valve 112 clearly shown in FIGS. 1–3. The number of inflation tubes included within the air channel system 118 and the pressure to which the tubes are Charged to support the upper dome section 104 is selected to be adequate for the overall size of the shelter 100.

The pressurized air channel system 118 serves to support the multi-layer, weather-resistant material 122 which forms the upper dome section enclosure 124 and which can be formed of a known PVC plastic, rubber or film-coated material or equivalent which repels the elements. The weather-resistant material 122 includes a top section 160 which is ring shaped and a sloping section 162. The combination of the top section 160 and the sloping section 162 form the upper dome section enclosure 124 as shown in FIGS. 1 and 2.

The multi-layer feature of the weather-resistant material 122 serves to form the top section 160 and the sloping section 162 as well as the plurality of inflation tubes of the air channel system 118 in the following manner. The weather-resistant material 122 includes an outer plastic layer 164, an inner plastic layer 166 and an inner fabric layer 168. The inner fabric layer 168 is adhered to the inner plastic layer 166, usually by adhesives, to form a plastic coated fabric layer as is known in the art. Typically, the outer plastic layer 164 and the inner plastic layer 166 (and, by necessity, the inner fabric layer 168) are heat sealed together as shown in the top section 160 of FIG. 3. This heat sealed construction of the two plastic layers 164 and 166 is also typical of the sloping sections 162 shown in FIG. 2. Thus, the plastic layers 164 and 166 are adhered together except where an inflation tube of the air channel system 118 exists.

Figure 4:
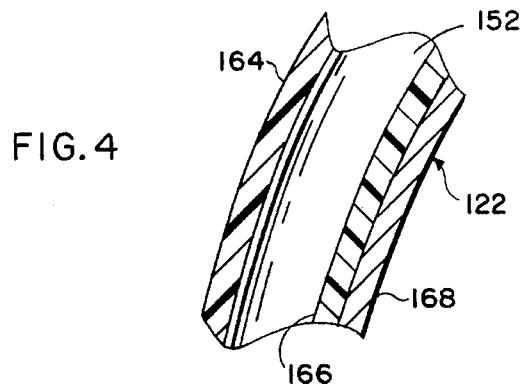
FIG. 4 is a detail view of the pet emergency disaster shelter of FIG. 3 showing a portion of a multi-layer, whether-resistant material utilized to enclose the upper dome section.

Each of the inflation tubes of the air channel system 118 is formed by separating the outer plastic layer 164 from the inner plastic layer 166 as is shown in FIG. 3. Thus, at the situs of the inflation tubes on the weather-resistant material 122, the outer plastic layer 164 is separated from, e.g., not heat sealed to, the inner plastic layer 166. This construction is illustrated in the lateral vertical inflation tubes 152 and 154 shown in FIG. 3. A detail view of the multi-layer construction of the weather-resistant material 122 is shown in FIG. 4. The inner plastic layer 166 is shown adhered to the inner fabric layer 168 to form the plastic coated fabric layer. The outer plastic layer 164 is shown separated, e.g., not heat sealed, to the inner plastic layer 166 in FIG. 4 which forms, in this particular detail, inflation tube 152. As with the remainder of the inflation tubes of the air channel system 118, inflation tube 152 can be charged with air via air inflation valve 112 to provide the vertical support for the weather-resistant material 122 of the upper dome section 104.

Figure 5:
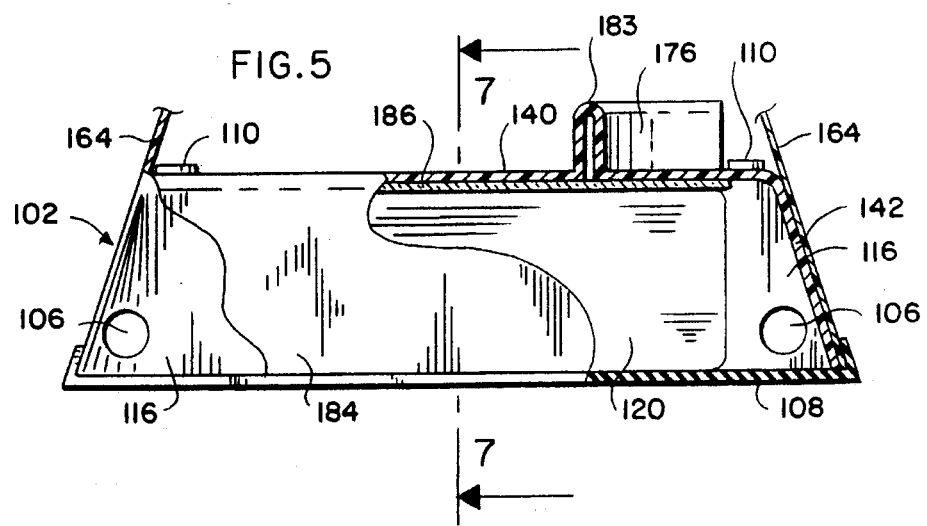
FIG. 5 is a fragmentary front elevational view of the buoyant shell base section of the pet emergency disaster shelter of FIG. 1 showing a top surface and an air mattress mounted within the buoyant shell base section for supporting the weight of a pet positioned on the top surface.
Figure 7:
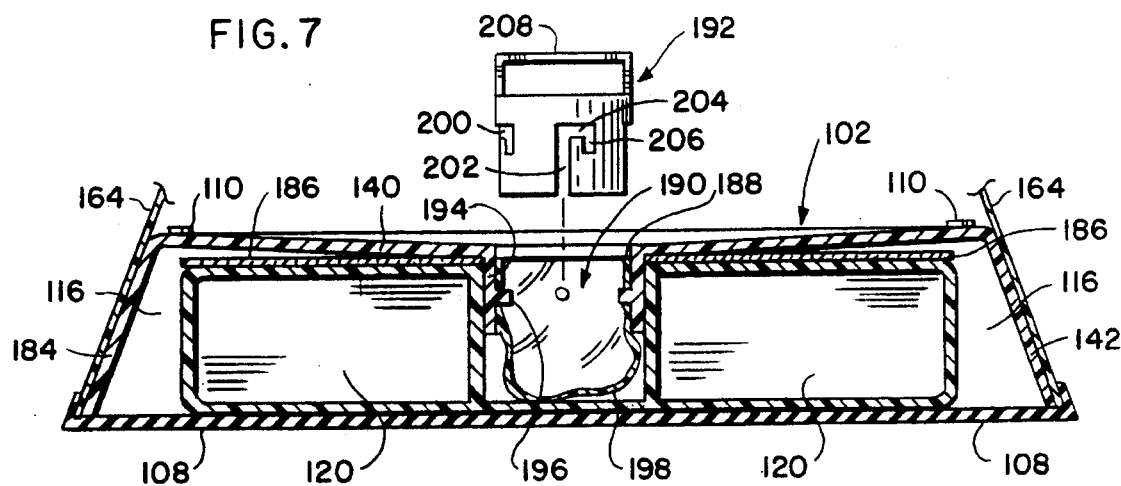
FIG. 7 is a cross-sectional view of the buoyant shell base section of the pet emergency disaster shelter taken along the line 7—7 of FIG. 5 showing a waste material depository positioned within the center of the air mattress and a disposable container within the waste depository and a hollow waste depository cap separated therefrom.

The inner fabric layer 168 and the inner plastic layer 166 adhered thereto extend from the top section 160 of the weather-resistant material 122 to the top surface 140 of the lower base section 102 as shown symbolically in FIG. 3. The inner fabric layer 168 can be made of cotton or hemp which is strong, e.g., wear resistant, and serves to provide warmth and comfort to the pet inhabiting the shelter 100. The inner plastic layer 166 adhered to the inner fabric layer 168 can be attached to the top surface 140 of the lower base section 102 as by adhesives. The outer plastic layer 164, however, extends from the top section 160 of the upper dome section 104 beyond the top surface 140 (see FIG. 3) to the bottom of the lower base section 102. In particular, the outer plastic layer 164 covers and is adhered, as by adhesives, to the sides 142 of the lower base section 102 and tucks under the bottom surface 108 as shown in FIGS. 5 and 7. Therefore, the outer plastic layer 164 provides a continuous weather-resistant plastic layer from the top section 160 of the upper dome section 104 to the bottom surface 108 of the lower base section 102. This continuous weather-resistant plastic layer minimizes the possibility of leakage of fluid into the upper dome section enclosure 124 from the elements.

The rear portion of the upper dome section enclosure 124 which is inhabited by the pet during an emergency situation is shown in FIG. 3. Immediately visible is a rear horizontal window 170 located within the sloping section 162 of the weather-resistant material 122 between the pair of rear vertical inflation tubes 156 and 158 (shown best in FIG. 2). The rear window 170 is also comprised of, for example, nylon mesh and is employed to promote ventilation within the upper dome section enclosure 124 for the comfort of the pet inhabitant. Both the front window 126 and the rear window 170 are set in the weather-resistant material 122 between the outer plastic layer 164 and the inner plastic layer 166 by heat sealing as is known in the ark.

Also included within the upper dome section enclosure 124 is a water source 172, a food source 174 and a food bowl 176 as shown in FIG. 3. Each of these features of the shelter 100 are necessary for the survival of the pet while occupying the upper dome section enclosure 124 during an emergency. The water source 172 can be, for example, a two liter size water bottle typically mounted upside down and designed specifically for use by pets. The water source 172 includes a spout 178 having a drip control device such as a gate valve (not shown) positioned within the end of the spout 178. By applying pressure at the end of the spout 178 with its tongue, the pet is able to draw water from the water source 172. One such water bottle known in the art is marketed under the commercial name "Lick It".

The water source 172 is held in the upside down position as shown in FIG. 3 by a bottle container sleeve 180. The container sleeve 180 can be comprised of any suitable material which can be conveniently attached, adhered, heat sealed, sewn or affixed to the inner fabric layer 168. The dimensions of the container sleeve 180 are such that the spout 178 and a reduced diameter, e.g., funnel shaped, upper portion of the water source 172 will pass through the top of the sleeve 180. However, the larger diameter mid-section of the water source 172 will not pass through the container sleeve 180. Thus, the water source 172 will be suspended upside down inside the container sleeve 180 and accessible to the pet within the upper dome section enclosure 124.

The food source 174 can be a typical regular size cardboard box of pet food normally available at retail grocery and pet store outlets. The top of the cardboard box food source 174 is removed and turned upside down into a funnel-shaped food sleeve 182 as is shown in FIG. 3. The pet food falls from the food source 174 through the food sleeve 182 and into the food bowl 176. As the pet food is consumed, the remainder of the food that is backed-up in the funnel-shaped portion of the food sleeve 182 gravity falls into the food bowl 176. The funnel-shaped food sleeve 182 can also be comprised of any suitable material which can be conveniently attached, adhered, heat sealed, sewn or affixed to the inner fabric layer 168. The food source 174 fits into the top of the food sleeve 182 but is blocked from further travel therein by the funnel-shaped dimension of the food sleeve 182.

Figure 6:
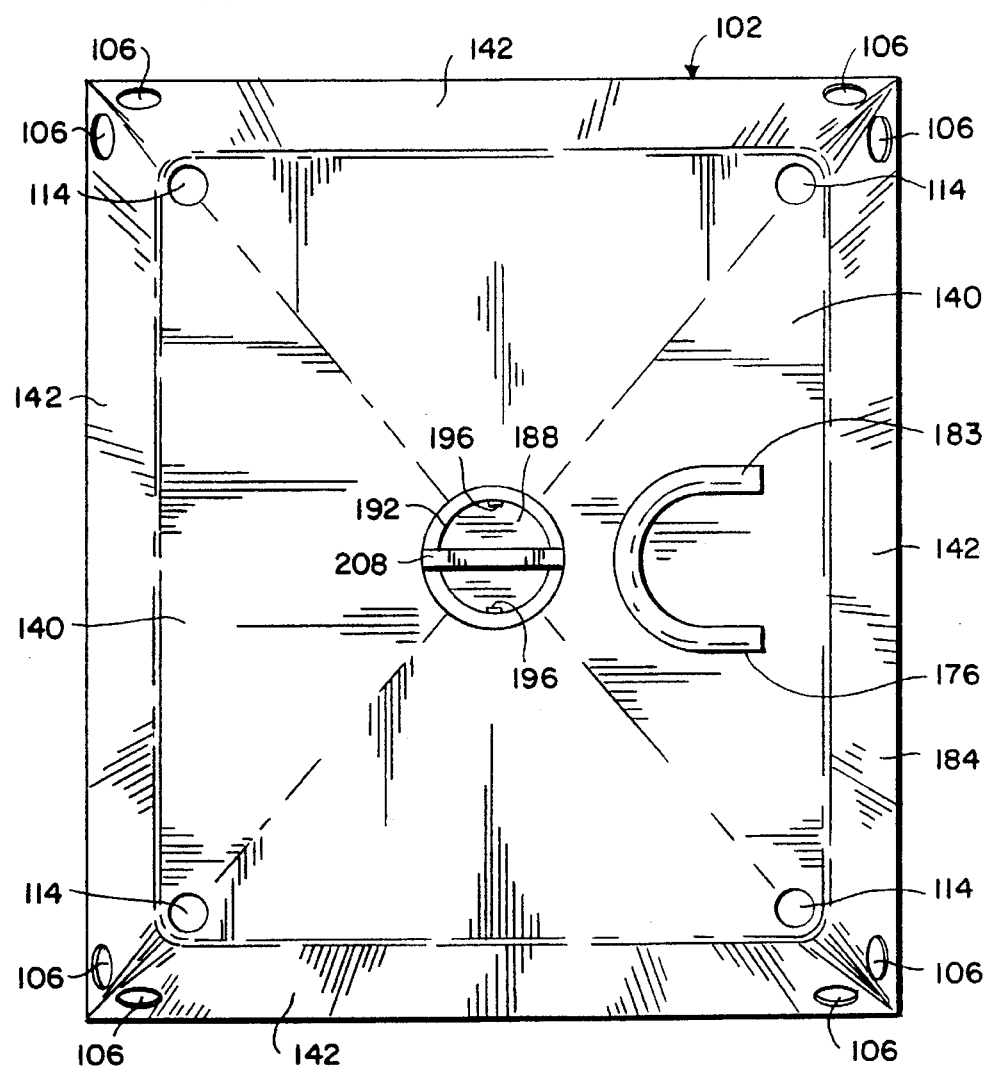
FIG. 6 is a top planar view of the buoyant shell base section of the pet emergency disaster shelter of FIG. 1 showing a sloped top surface and a hollow waste depository cap mounted within a center penetration formed within the top surface.

Formed on the top surface 140 of the lower base section 102 beneath the food sleeve 182 is the food bowl 176 as is shown in FIG. 3. The food bowl 176, which is also shown in FIGS. 5 and 6, is fashioned from the same hard shell plastic utilized to form the top surface 140 during, for example, an injection molding process. The food bowl 176 is formed as a vertical projecting edge 183 upon the sloping top surface 140 of the lower base section 102 as is clearly shown in the cutaway side view of FIG. 5. The edge 183 is horseshoe shaped as shown in the plan view of FIG. 6 with the open end of the edge 183 abutting the inner fabric layer 168 of the multi-layer, weather-resistant material 122 (see FIG. 3). The bottom end of the funnel-shaped food sleeve 182 is positioned directly over the food bowl 176. This enables the pet food that gravity falls from the food source 174 to pass through the food sleeve 182 and into the food bowl 176 which is accessible to the pet. Also shown in the cross-sectional view of FIG. 3 is the top ring inflation tube 146 and the base perimeter inflation tube 144 mounted upon and attached, as by adhesives, to the top surface 140 of the lower base section 102.

The lower base section 102 is shown in frontal elevation in FIG. 5, a portion of which is partially fragmented. The lower base section 102 comprises a lightweight, high-strength, hard shell 184 fashioned from, for example, polyvinyl chloride (PVC) or an equivalent plastic. The gauge of the PVC plastic or equivalent is approximately 1/16" but can vary depending upon the size of the shelter 100 and the anticipated weight of the pet to reside therein. Because the lower base shell 184 is comprised of PVC, is hollow, does not include external openings and uses recycled tires to form the bottom surface 108, the lower base shell 184 is buoyant and suitable for use in water.

The upper portion of the plastic buoyant shell 184 is the Lop surface 140 best shown in FIGS. 5, 6 and 7. The top surface 140 is that part of the shelter 100 on which the pet is seated. The top surface 140 in combination with the air mattress 120 supports the weight of the pet. The top surface 140 is comprised of the same lightweight, high-strength plastic that is employed to fashion the remainder of lower base section 102. However, in order for the air mattress 120 to assist in providing support to the pet, the top surface 140 must be somewhat flexible. The flexibility of the top surface 140 becomes more apparent as the weight of the pet residing therein increases. Under these conditions, the air mattress 120 would assume more of the support of the weight of the pet.

Inside the plastic buoyant shell 184 is a void that contains the air mattress 120 which is positioned directly beneath the top surface 140. The air mattress 120 is clearly shown in the partially fragmented portion of FIG. 5, e.g., that area in which a portion of the side 142 of the buoyant shell 184 has been removed. The air mattress 120 exhibits a sealed robust construction comprised of any of several strong, durable lightweight plastic materials which is preinflated to an appropriate air pressure. The pressure to which the air mattress 120 is preinflated is a function of the size of the shelter 120 and, of course, the approximate weight of the pet to be housed therein. Since the air mattress 120 is preinflated, it does not include an inflation valve or other air intake means. The air mattress 120 can assume any of a plurality of shapes that can be conveniently placed within the lower base section 102.

Positioned between the top surface 140 of the lower base section 102 and the air mattress 120 is an insulation layer 186 as shown in the partial cross-sectional views of FIGS. 5 and 7. The insulation layer 186 is comprised of a thin layer of, for example, styrofoam or other lightweight insulation material. The insulation layer 186 serves to insulate the pet seated on the top surface 140 of the lower base section 102 from extreme temperatures outside and beneath the buoyant shell 184. For example, if the buoyant shell 184 is partially submerged in water during flood conditions, the top surface 140 is insulated from that portion of the buoyant shell 184 submerged in water. Even though the buoyant shell 184 is water resistant, the dampness and cold of the flood waters would draw heat from the upper dome section enclosure 124 if it were not for the insulation layer 186.

The lower base section 102 of the shelter 100 is generally rectangular in shape as is clearly shown in FIG. 6. Thus the lower base section 102 includes four corners each providing access to the ballast compartments 116. One of the ballast compartments 116 is clearly shown in FIG. 5 (right side) while two of the ballast compartments 116 are clearly shown in FIG. 7. Each of the openings 114 to the ballast compartment 116 are clearly shown in FIG. 6. The openings 114 are shown covered by the plurality of plastic hinged caps 110 in FIGS. 5 and 7.

During an emergency when the shelter 100 is in use, the pet will be located on the top surface 140 of the lower base section 102. The pet will, of course, be moving about the space provided on the top surface 140 which serves as the floor of the upper dome section enclosure 124. In order to prevent the lower base section 102 from capsizing from extreme shifting of the weight of the pet on the top surface 140, the ballast compartments 116 have been provided. Each of the ballast compartments 116 is located immediately beneath the top surface 140 and includes a void or air space located in and adjacent each corner of the lower base section 102 as shown in FIGS. 5–7.

It is to be understood that although access to each ballast compartment 116 is provided at each corner opening 114, the ballast compartment 116 in its entirety actually surrounds the air mattress 120 located within the buoyant shell 184. It is noted that FIG. 7 is a cross-sectional view of FIG. 5. Upon inspection, it is noted that the ballast compartments 116 shown in FIG. 7 actually surround the air mattress 120 shown in FIG. 5. Thus, in reality, the several ballast compartments 116, each of which are accessible at their corresponding corner opening 114, form a combined ballast compartment 116. Further, the volume of the combined ballast compartment 116 is limited to each corner within the lower base section 102 plus the space located between air mattress 120 and the sides 142 of the buoyant shell 184.

Each of the ballast compartments 116 is filled with a substance referred to as a ballast. The purpose of the ballast is to add weight to the lower base section 102 so that the weight of the pet is not a major percentage of the overall weight of the shelter 100. The ballast compartments 116 assure that extreme movements of the pet, e.g., from one side of the shelter 100 to the other, do not cause the lower base section 102 to capsize. Thus, the ballast serves to help stabilize the weight of the lower base section 102. The ballast can be comprised of any of several types of matter, especially granular matter such as sand but can also be dirt, gravel or an equivalent thereto. The ballast can be added to the ballast compartments 116 via the holes 114 and subsequently covered by the plastic hinged caps 110 via a snap fit as is known in the art. As is shown in FIGS. 5 and 7, the ends of the insulation layer 186 terminate just prior to the openings 114 to avoid interference in depositing the ballast in the ballast compartments 116.

Also shown in FIG. 5 is the food bowl 176 which is comprised of the edge 183 of the top of the buoyant shell 184 raised above the top surface 140. The cross-sectional view of the top surface shown in FIG. 5 makes clear that the food bowl 176 is a raised edge 183, not a concave formation in the top surface 140. The raised edge 183 of the food bowl 176 serves to contain the pet food that is vertically deposited from the food source 174 shown in FIG. 3. Also shown in FIG. 5 is the outer plastic layer 164 of the multi-layer, weather-resistant material 122 extending downward from the upper dome section 104. The outer plastic layer 164 extends down to and terminates between the side 142 and the bottom surface 108 comprised of recycled tire.

A plane view of the top portion 140 of the lower base section 102 is shown in FIG. 6. An opening 114 for each of the ballast compartments 116 is clearly shown in each corner. Also, the plurality of tie-down penetrations 106 are shown at the bottom corner of each of the plurality of sides 142 of the buoyant shell 184. The tie-down penetrations 106 are utilized to attach a rope or the like to the lower base section 102 to prevent the shelter 100 from floating away during a flood condition. Also, the horseshoe-shaped edge 183 of the food bowl 176 formed on the top surface 140 of the lower base section 102 is shown positioned directly beneath where the funnel-shaped food sleeve 182 will be located (as shown in FIG. 3).

As can be seen in FIG. 6, the top surface 140 is slightly sloped downward to the center thereof at approximately five degrees as is indicated by the dashed crossed lines intersecting at the center of the top surface 140. Located at the center of the top surface 140 and at the intersection of the dashed crossed lines is a circular opening 188. The downward slope of the top surface 140 in combination with the circular opening 188 serves to promote the collection and deposit of pet waste material into a waste collection depository 190 clearly shown in FIG. 7. The minimal downward slope of the top surface 140 toward the center opening 188 is believed to be adequate to urge the movement of pet waste material toward the center opening 188 and into the waste collection depository 190. However, this minimal slope of approximately five degrees is not believed to be sufficient to interfere with the comfort or stability of the pet positioned upon the top surface 140. Mounted within the circular opening 188 of the top surface 140 (as shown in FIG. 6) and extending down into the waste collection depository 190 (see FIG. 7) is a locking hollow waste depository cap 192.

The particulars of the waste collection depository 190 are shown in FIG. 7 which is a cross-section taken through the lower base section 102. A main feature shown in FIG. 7 which is not shown in the remaining views is that the air mattress 120 includes a hole in the center thereof to accommodate the waste collection depository 190. The hole located in the center of the air mattress 120 coincides with the hole 188 formed in the top surface 140 as is shown in FIG. 7. Therefore, the air mattress 120 exhibits a toroidal shape, e.g., donut shape, providing support to the underside of the top surface 140 and providing space for the waste collection depository 190 at the center of the air mattress 120.

The air mattress 120 is shown mounted on the upper side of the bottom surface 108 of the lower base section 102 in FIG. 7. Positioned between the air mattress 120 and the top portion 140 is the insulation layer 186. The downward slope of the top portion 140 toward the center opening 188 is clearly visible in FIG. 7. Located at the two corners (shown in FIG. 7) on the top surface 140 are the hinged caps 110 which provide access to the ballast compartments 116. Adhered to the sides 142 of the buoyant shell 184 is the outer plastic layer 164 of the weather-resistant material 122 which fits between the side 142 and the bottom surface 108 of the lower base section 102.

The top surface 140 shown in FIG. 7 does not terminate at the circular opening 188 but turns orthogonally downward into the waste collection depository 190 forming a cylindrical extension 194. The cylindrical extension 194, which is shaped in the form of a sleeve, extends down into the waste collection depository 190 adjacent to the air mattress 120. It is noted that the cylindrical extension 194 could be extended from the top surface 140 to the bottom surface 108 of the buoyant shell 184. The cylindrical extension 194 is fashioned from the same lightweight unbreakable plastic material as the remainder of the buoyant shell 184. Molded to the inside of the cylindrical extension 194 at ninety degree increments or quadrants is a plurality of four protuberances 196. The protuberances 196 extend into the waste collection depository 190 as is shown in FIGS. 6 and 7. Seated on the sealed bottom of the waste collection depository 190 is a disposable container 198 which can be, for example, a plastic bag for collecting pet waste material. The open end of the disposable container 198 is placed over the plurality of protuberances 196 and is held in position by the locking hollow cap 192 as described hereinbelow.

The locking hollow cap 192 is designed to lock the disposable container 198 in position within the waste collection depository 190 and to provide a location to tether the pet within the upper dome section enclosure 124. The locking hollow cap 192 is a hollow open sleeve or cylinder that fits concentrically into the cylindrical extension 194 as shown in FIG. 7. The surface of the hollow cap 192 includes a plurality of four slots 200. The locations of the slots 200 on the hollow cap 192 correlate with the locations of the plurality of protuberances 196 formed on the cylindrical extension 194. The slots 200 are each formed in the shape of an upside-down letter "J" including an entry slot 202, a horizontal slot 204 and a dead position 206 as shown in FIG. 7. The hollow cap 192 also includes a handle 208 as shown in FIGS. 6 and 7.

Because the location of the slots 200 on the hollow cap 192 correlate with the locations of the protuberances 196 formed on the cylindrical extension 194, there is a one-to-one correspondence between the protuberances 196 and the slots 200. Thus, when the hollow cap 192 is inserted into the cylindrical extension 194 of the waste collection depository 190, each of the slots 200 can be aligned with a corresponding protuberance 196. Under these conditions, each of the protuberances 196 enters a corresponding entry slot 202 on the hollow cap 192. As the hollow cap 192 is inserted into the cylindrical extension 194, each protuberance 196 travels along the entry slot 202. At the end of the travel of the entry slot 202, the handle 208 is manually rotated in the appropriate direction so that each protuberance 196 enters the corresponding horizontal slot 204. When the protuberance 196 reaches the end of the horizontal slot 204, the hollow cap 192 is in the locked position. Any attempt to pull the hollow cap 192 out of the cylindrical extension 194 will result in each of the protuberances 196 being abutted by the corresponding dead position 206.

When the hollow cap 192 is completely inserted into the cylindrical extension 194, the handle 208 extends above the top surface 140 into the upper dome section enclosure 124 as shown by referring to both FIGS. 6 and 7. When in the locked position, the hollow cap 192 is immovable since any attempt to pull it from the cylindrical extension 194 results in the protuberances 196 abutting the dead position 206. Therefore, the resident pet can be tethered to the handle 208 when the hollow cap 192 is in the locked position. This arrangement prevents an anxious pet from attempting to escape from the shelter 100 particularly during extreme weather conditions, e.g., during a flood.

Prior to inserting the hollow cap 192 into the cylindrical extension 194, the open end of the disposable container 198, e.g., the plastic bag for collecting pet waste material, is placed over the plurality of protuberances 196 as is clearly shown in FIG. 7. After the hollow cap 192 is inserted into the cylindrical extension 194 and rotated into the locked position, the open end of the disposable container 198 is captured between each of the protuberances 196 and the corresponding horizontal slot 204 of the hollow cap 192. This design ensures that the disposable container 198 is retained in the proper position at the sealed bottom of the waste collection depository 190.

Placing the disposable container 198 in this position facilitates the collection of pet waste material that passes through the cylindrical opening 188 and the hollow cap 192 and isolates the waste material from the air mattress 120. After the pet is rescued, the disposable container 198 can be conveniently removed and disposed of in a suitable manner. This is accomplished simply by rotating the handle 208 in the appropriate direction to remove each protuberance 196 from the locked position and then pulling upward. The disposable container 198 can then be removed, sealed and disposed of. Since the waste collection depository 190, hollow cap 192 and top surface 140 are each fashioned from the same lightweight, unbreakable plastic material as the remainder of the buoyant shell 184, they can be easily cleaned.

When it is necessary for the pet to discharge waste material, the sloped top surface 190 clearly shown in FIGS. 6 and 7 facilitates the movement of the waste material toward the circular opening 188. Since the locked hollow cap 192 is an open sleeve or cylinder, the pet waste material passes through both the circular opening 188 and the hollow cap 192. The pet waste material is then intercepted and collected by the disposable container 198 of the waste collection depository 190. It is noted that the novel design comprising the cylindrical extension 194 and the corresponding hollow cap 192 combine (a) to facilitate the locking and unlocking of the hollow cap 192 to and from the cylindrical extension 194, (b) to secure the disposable container 198 at the specific location to intercept and collect the pet waste material passing through the cylindrical opening 188 and the hollow cap 192, and (c) to facilitate the tethering of the resident pet to the handle 208.

The present invention provides novel advantages over other means of emergency pet rescue known in the art. The invention teaches an emergency shelter 100 comprising a buoyant lower base section 102 suitable for use in water and an upper dome section 104. The lower base section 102 includes an air mattress 120 that assists in supporting the weight of the pet. The upper dome section 104 is comprised of a weather-resistant material 122 held in position by a pressurized air channel system 118. The upper dome section 104 serves as the living quarters of the pet and includes an access door 128, windows 126 and 170 and facilities for food, water and waste material collection.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

It is therefore intended by the appended claims to cover any and all such modifications, applications and embodiments within the scope of the present invention. Accordingly,

What is claimed is:

1. A shelter for use by a pet during a natural disaster comprising:

lower base means formed of a moisture-resistant, buoyant shell having a top surface supported by an air mattress positioned within said buoyant shell, said top surface and said air mattress for supporting the weight of said pet; and upper dome means mounted upon said lower base means for housing said pet, said upper dome means including a weather-resistant material for providing protection to said pet against a plurality of weather conditions.

2. The shelter of claim 1 wherein said moisture-resistant buoyant shell is comprised of plastic.

3. The shelter of claim 1 wherein said lower base means includes a moisture-proof sealed bottom surface.

4. The shelter of claim 1 wherein said top surface of said lower base means is downwardly sloped to a penetration formed in said top surface for directing pet waste material therethrough.

5. The shelter of claim 1 wherein said lower base means includes a depository for collecting pet waste material.

6. The shelter of claim 1 wherein said lower base means includes a depository connected to a penetration formed in said top surface for collecting pet waste material.

7. The shelter of claim 1 wherein said lower base means includes a depository for collecting pet waste material, said depository including a disposable container and a hollow cap for locking said disposable container in said depository.

8. The shelter of claim 1 wherein said lower base means further includes a plurality of penetrations for connecting a tether line to said shelter.

9. The shelter of claim 1 wherein said lower base means further includes a ballast compartment for balancing said shelter.

10. The shelter of claim 1 further including a raised edge formed on said top surface of said lower base means for providing a serving dish for said pet.

11. The shelter of claim 1 wherein said upper dome means further includes an air channel system for supporting said weather-resistant material in position.

12. The shelter of claim 1 wherein said weather-resistant material of said upper dome means is comprised of an outer layer and an inner layer and a natural fiber layer adhered to said inner layer.

13. The shelter of claim 12 wherein said outer layer and said inner layer of said weather-resistant material are comprised of polyvinyl chloride.

14. The shelter of claim 1 wherein said upper dome means further includes at least one ventilation window comprised of nylon mesh material.

15. The shelter of claim 1 wherein said upper dome means further includes a door comprised of a flap of said weather-resistant material wherein said door is opened and closed by a mechanical zipper.

16. The shelter of claim 1 wherein said upper dome means further includes means for providing food and water to said pet within said upper dome means.

17. A shelter for use by a pet during a natural disaster comprising:

a lower base formed of a moisture-resistant, buoyant shell having a top surface supported by an air mattress positioned within said buoyant shell, said top surface and said air mattress for supporting the weight of said pet;

an upper dome mounted upon said lower base for housing said pet, said upper dome including a weather-resistant material for providing protection to said pet against a plurality of weather conditions; and means for disposing of pet waste material.

18. A method of constructing a shelter for use by a pet during an emergency, said method comprising the steps of:

forming a lower base section comprised of a moisture-resistant, buoyant shell;

providing a top surface on said lower base section for supporting the weight of said pet;

supporting said top surface with an air mattress positioned within said lower base section;

mounting an upper dome section upon said lower base section for housing said pet; and enclosing said upper dome section with a weather-resistant material for providing protection to said pet against a plurality of weather conditions.

19. The method of claim 18 further including the step of mounting a water and food dispensing source within said upper dome section.

20. The method of claim 18 further including the step of forming a depository within said lower base section for collecting pet waste material.

* * * * *